(12) United States Patent
Maeder et al.

(10) Patent No.: US 8,774,865 B2
(45) Date of Patent: *Jul. 8, 2014

(54) METHOD FOR OPERATING A BASE STATION AND BASE STATION

(71) Applicant: NEC Euerope Ltd., Heidelberg (DE)

(72) Inventors: Andreas Maeder, Heidelberg (DE); Linghang Fan, Surrey (GB); Michael Einhaus, Heidelberg (DE)

(73) Assignee: NEC Europe Ltd., Heidelberg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/028,918

(22) Filed: Sep. 17, 2013

(65) Prior Publication Data

US 2014/0018092 A1 Jan. 16, 2014

Related U.S. Application Data

(63) Continuation of application No. 13/258,657, filed as application No. PCT/EP2010/002636 on Apr. 29, 2010, now Pat. No. 8,565,824.

(30) Foreign Application Priority Data

Apr. 29, 2009 (EP) .................................. 09251217
Jul. 6, 2009 (EP) .................................. 09251741

(51) Int. Cl.
*H04B 1/38* (2006.01)
*H04W 4/00* (2009.01)

(52) U.S. Cl.
USPC ........................................ 455/561; 455/422.1

(58) Field of Classification Search
USPC ............................................ 455/422.1, 452.1
See application file for complete search history.

(56) References Cited

U.S. PATENT DOCUMENTS

| 7,944,867 | B2 | 5/2011 | Usuba |
| 8,565,824 | B2 * | 10/2013 | Maeder et al. ................ 455/561 |
| 2007/0066329 | A1 | 3/2007 | Laroia et al. |
| 2008/0188265 | A1 | 8/2008 | Carter et al. |
| 2009/0262675 | A1 | 10/2009 | Tsai |
| 2010/0016022 | A1 | 1/2010 | Liu et al. |

FOREIGN PATENT DOCUMENTS

| JP | 2002152129 | 5/2002 |
| JP | 2002158609 | 5/2002 |
| JP | 2008261207 | 10/2008 |
| JP | 2009510835 | 3/2009 |
| WO | 2006088135 | 8/2006 |
| WO | 2008/004099 | 1/2008 |

OTHER PUBLICATIONS

International Search Report, dated Nov. 5, 2010, from corresponding PCT application.
Translation of Japanese Office Action, dated Feb. 14, 2013, from corresponding JP application.

* cited by examiner

*Primary Examiner* — Michael Faragalla
(74) *Attorney, Agent, or Firm* — Young & Thompson

(57) ABSTRACT

A method for operating a base station of a mobile wireless system, in particular of a mobile communications network, wherein the base station is configured to operate in different operation states, wherein the operation states at least include an active operational mode, in which the radio interface subsystem of the base station is fully activated, and a low-duty operational mode with reduced radio transmission activity, is characterized in that in the low-duty operational mode the base station implements a window mechanism including availability intervals during which radio transmissions are allowed and unavailability intervals in which no radio transmissions are allowed. Furthermore, a corresponding base station for deployment in a mobile wireless system is disclosed.

20 Claims, 8 Drawing Sheets

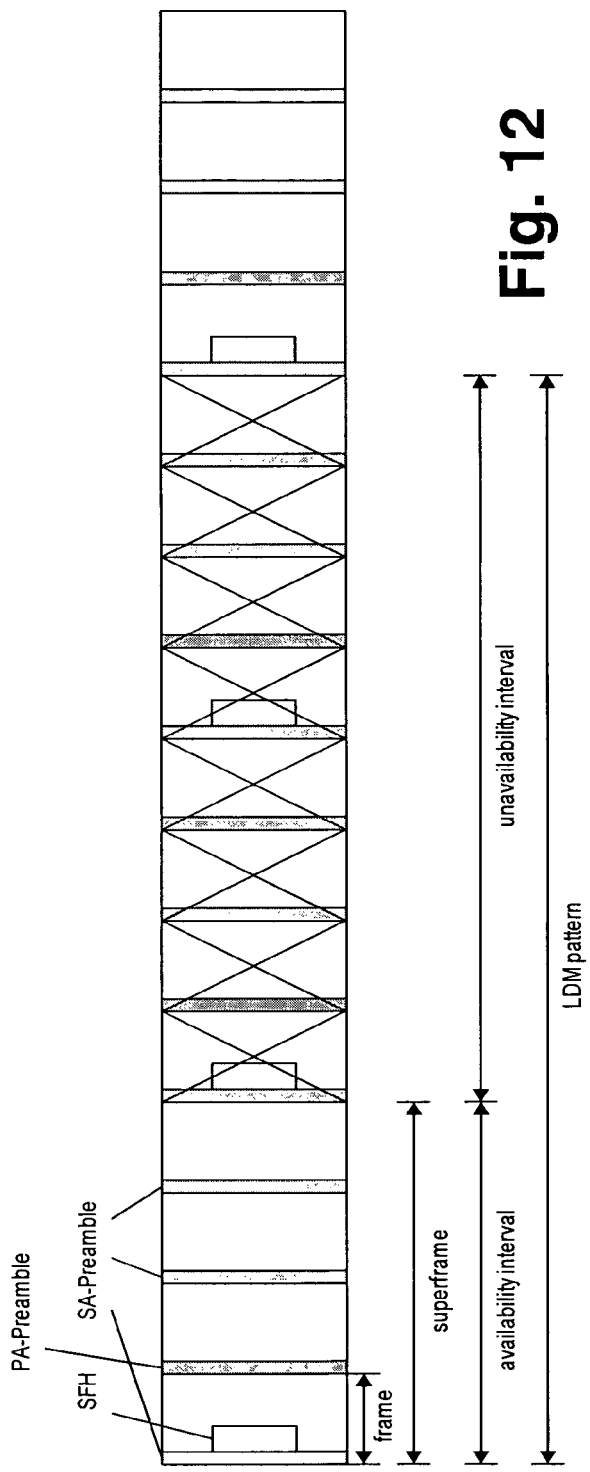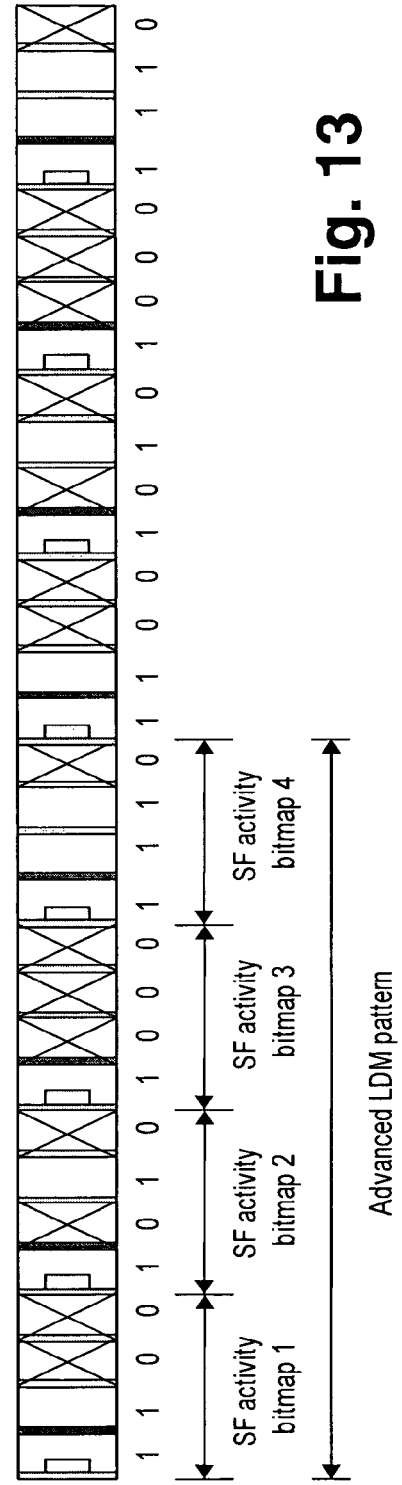

METHOD FOR OPERATING A BASE STATION AND BASE STATION

Figure 1:
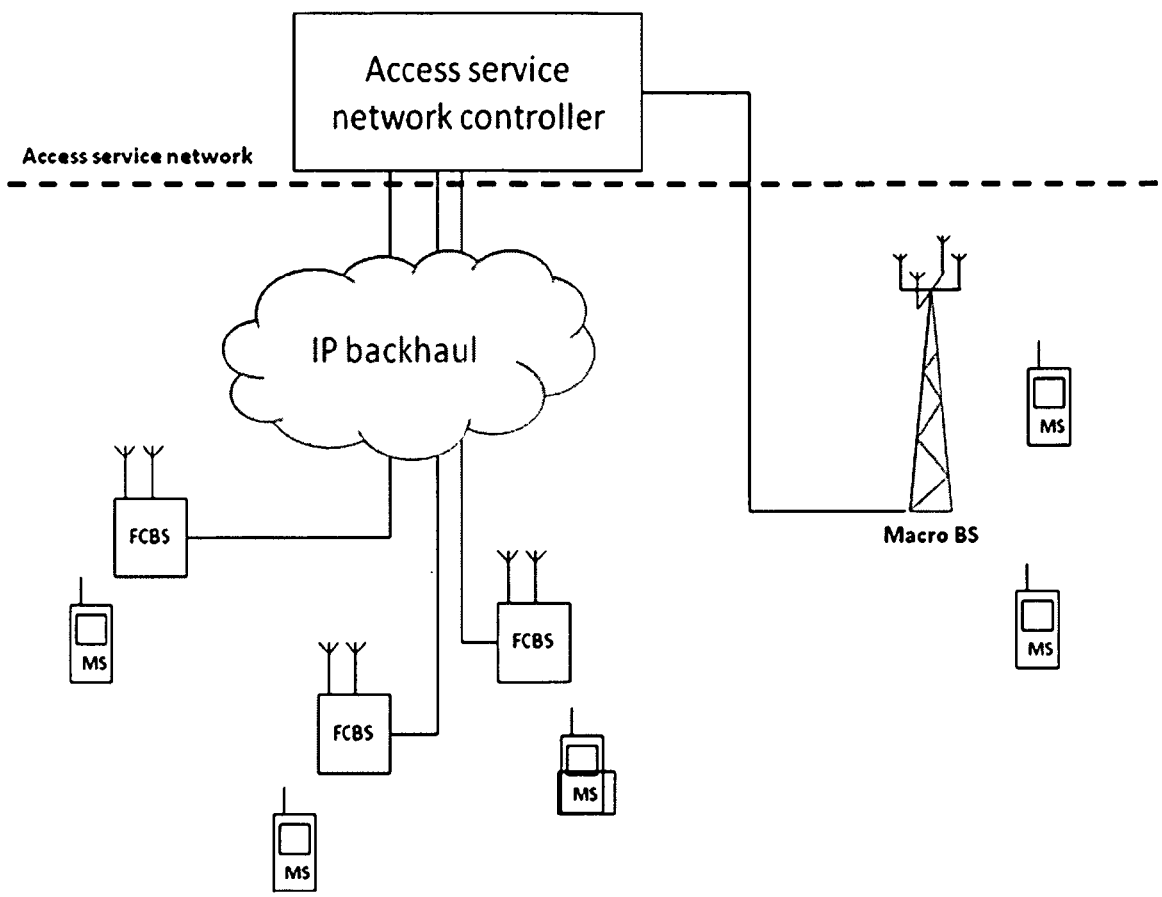

The present invention relates to a method for operating a base station of a mobile wireless system, in particular of a mobile communications network, wherein said base station is configured to operate in different operation states, wherein said operation states at least include an active operational mode, in which the radio interface subsystem of said base station is fully activated, and a low-duty operational mode with reduced radio transmission activity.

Furthermore, the present invention relates to a base station for deployment in a mobile wireless system, said base station being configured to operate in different operation states, wherein said operation states at least include an active operational mode, in which the radio interface subsystem of said base station is fully activated, and a low-duty operational mode with reduced radio transmission activity.

Energy consumption, electromagnetic emissions and interference are important factors which may influence the performance and the acceptance of products involved in wireless broadband communication. For example, in the document of the European Commission "Code of Conduct on Energy Consumption of Broadband Equipment, Version 3", Nov. 18, 2008 it is stated that "The potential new electrical load represented by this (i.e. broadband) equipment needs to be addressed by EU energy and environmental policies. It is important that the electrical efficiency of broadband equipment is maximised". Apart from conventional base stations, this is an especially important factor for so called femtocell base stations (also known as home base stations, home BTS, picocells, home NBs, home eNBs, femtocell access points (FAPs), or femto radio base stations), which are devices being installed by customers in their premises.

There is currently an interest from mobile network operators to deploy such femtocells, which would be installed within the homes of the operators' customers themselves in a "plug-and-play" manner (see for reference Airvana whitepaper, "Femtocells: Transforming The Indoor Experience"). Such femtocells are low power mobile base stations, currently being developed and standardized for both 3G and 4G networks, at the edge of the operator network. Femtocell base stations are connected to a normal broadband internet connection, and the radio interface is based on wide area cellular network standards such as WiMAX (Worldwide Interoperability for Microwave Access), UMTS (Universal Mobile Telecommunications System) or 3GPP LTE (Long Term Evolution).

One reason for the introduction of femtocells is the increase of operator network coverage for the sake of a better user experience and therewith to make a big step towards fixed-mobile-convergence. Like Wi-Fi access points, femtocells are designed to be deployed in home and office environments in order to give good coverage in the respective area and deployment of high density is expected in areas with high population or office density. However, the deployment of femtocells comes along with drawbacks of which one is interference effects between macro and femto levels of the network. Since femtocell base stations are often deployed in the same licensed spectrum as the wide area network of the operator it is important to configure the radio interface correctly to avoid interference with other base stations. Generally, femtocell networks in a dense deployment are interference limited, meaning that any measures to decrease inter-cell interference will benefit directly to user QoS and system capacity.

Femtocell base stations have some unique properties which distinguish them from other wireless devices like macro-cell base stations or WiFi access points:

1. Although customer-deployed, femtocell BSs are part of an operator's radio access network with similar requirements as macro-cell base stations. For example, the IEEE 802.16m SRD (IEEE 802.16m-07/002r6 Requirements for the P802.16m-Advanced Air Interface", IEEE 802.16 Broadband Wireless Access Working Group, 18 Sep. 2008) lists hand-overs and synchronization to macro-cell BSs and femtocell BSs as requirements. This implies that a femtocell BS has interfaces to higher layer network elements of the operator, like the ASN-GW (Access Service Network Gateway) in case of WiMAX.

2. Femtocell BSs are also under the direct physical control of the customer, which means that they can always be switched on and off manually. To avoid uncontrolled shutdowns and its potentially negative effects on the overall network stability, the femtocell BS should implement mechanisms to avoid uncontrolled device shutdowns in order to maintain network stability and user quality of service.

It is an object of the present invention to improve and further develop a method for operating a base station and a base station of the initially described type in such a way that, by employing mechanisms that are readily to implement, interferences with neighboring femtocells and macro cells as well as power consumption are significantly reduced.

In accordance with the invention, the aforementioned object is accomplished by a method comprising the features of claim 1. According to this claim such a method is characterized in that in said low-duty operational mode said base station implements a window mechanism including availability intervals during which radio transmissions are allowed and unavailability intervals in which no radio transmissions are allowed.

Furthermore, the aforementioned object is accomplished by a base station comprising the features of independent claim 17. According to this claim, such a base station is characterized in that in said low-duty operational mode said base station implements a window mechanism including availability intervals during which radio transmissions are allowed and unavailability intervals in which no radio transmissions are allowed.

According to the invention it has been recognized that energy and interference reduction can be supported by implementing a low-duty operational mode in which base stations apply a window mechanism with availability and unavailability intervals. During the availability intervals, operation of the base station follows a conventional approach as known from prior art, i.e. regular radio transmissions are allowed without any restrictions. During the unavailability intervals, however, no radio transmissions are allowed. By intermitting radio transmission during unavailability intervals, the base station does not only save energy, at the same time interference to neighboring or adjacent femtocell base stations as well as to co-existing macrocell base stations and umbrella cells will be significantly reduced. Implementing the availability and unavailability intervals in form of a window mechanism is particularly advantageous with respect to reliably ensuring service continuation, since the conditions and the specific terms of the window mechanism can be easily communicated to mobile stations connected to a mobile station.

Since the present invention can be built mostly on standard procedures, modifications of existing products are minimal and incompatibilities with existing products are very unlikely.

According to a preferred embodiment the base station is a femtocell base station. Although, on principle, the present invention can be applied in connection with any kind of base station, the resulting advantageous are most striking in case of home-deployed femtocell radio base stations. In particular in a dense deployment femtocell networks are strongly interference limited. Consequently, applying a low-duty operational mode as described above will result in significant inter-cell interference reductions, which in turn will benefit directly to user QoS and system capacity.

Advantageously, in low-duty operational mode the availability and unavailability intervals are created in form of a superposition of the sleep cycles of all mobile stations associated with the base station. In other words, the unavailability intervals are intervals where no mobile station requires the availability of the base station. As a consequence the base station can stop transmission of downlink control during these unavailability intervals.

With respect to reliable and efficient service continuity and performance stability, it may be provided that a base station, before entering low-duty operational mode, establishes a kind of hand-shake mechanism and informs all associated mobile stations of its availability and unavailability intervals. Since mobile stations are aware of their own availability intervals only, it is beneficial for them to be aware of availability/unavailability intervals at the base station such that mobile stations, which want to exit sleep or idle mode, know in which frame transmission opportunities in the uplink and downlink control information are available.

According to a preferred embodiment the base station is configured to receive information from associated mobile stations regarding an acceptance of its availability and unavailability intervals, before entering said low-duty mode. For instance, mobile stations in connected mode may inform the base station either of their acceptances of the availability and unavailability intervals, or mobile stations may indicate to the base station that current signaling (e.g. with respect to performing a handover or network entry) or pending traffic requires exiting sleep mode. In the latter case the base station's attempt to enter low duty mode is considered to having failed, and another attempt may be initiated at a later (predefined) point in time.

Advantageously, the base station is configured to re-negotiate the sleep cycles of mobile stations in connected mode for alignment purposes, before entering low duty mode. In connection with such re-negotiation, resource availability in the mobile station and at the base station can be taken into account, such that resource and quality of service requirements are fulfilled and the number of unavailability frames is maximized.

According to a specific embodiment, in order to indicate its availability and unavailability intervals to mobile stations the base station that is in low-duty operational mode may employ a signaling pattern that does not completely reflect the sleep cycles of all mobile stations associated with the base station. Such signaling pattern—denoted basic LDM (low-duty mode) pattern signaling—may be used in particular in connection with dynamic, implicitly adapted sleep cycles at the mobile stations, which cannot be mapped to a deterministic pattern at the base station. From perspective of a mobile station, by applying the basic LDM pattern signaling the mobile station is notified that the base station is available within the availability intervals at the mobile station itself, and in the signaled availability intervals of the basic LDM pattern signaling. However, it is not aware of the availability intervals of other mobile stations. Thus, only known availability frames can be used for unsolicited transmissions.

To avoid this problem and to enable mobile stations to perform a potentially faster network entry, it may alternatively provided that the base station in low-duty operational mode employs a signaling pattern that reflects the sleep cycles of all mobile stations associated with said base station. This implementation is denoted advanced LDM pattern signaling, and it may be used to indicate more complex availability interval occurrences. It is particularly suitable for patterns resulting from superposition of static sleep cycles.

According to a third alternative—referred to as transparent mode—it may be provided that in low-duty operational mode the base station guarantees each associated mobile station availability in frames indicated by the sleep cycle definition of the respective mobile station, without indicating its availability and unavailability intervals by means of any specific signaling information.

Normally, the length of the availability and unavailability intervals will be measured in terms of frames. However, in some situations it might be beneficial to measure the interval lengths in terms of superframes, as specified in IEEE 802.16 WG, "Part 16: Air Interface for Fixed and Mobile Broadband Wireless Access Systems; Advanced Air Interface (working document)", June 2009. By applying superframes as unit for interval length measurements, the required signaling overhead can be significantly reduced in certain cases.

According to a specific embodiment the active operational mode is configured as default operation state to be entered by the base station when performing a transition from an initialization state. The initialization state is the state the base station enters after being powered on. In this state, the base station is detached from the access service network. In case of detachment only very limited functionality is supported. As soon as network connectivity is available to the access service network, the base station authenticates and registers itself at an access service network controller, receives configuration data, sends status updates, and enters active operational mode.

With respect to a further improvement of energy and interference reduction a more diverse operation characteristic of a base station may be implemented. In particular, it may be provided that the base station's operation states include a further operational mode—radio interface listen mode—with no radio transmission activity, but with the base station being listening for potential connection attempts. This decreases the energy consumption but still enables fast reaction to handover or connection requests.

Additionally or alternatively, it may be provided that the base station's operation states include a further operational mode—radio interface off mode—in which the radio interface subsystem of the base station is completely switched off. However, in case of femtocell base stations the connection to higher layer controllers over the fixed network interface is maintained, such that the femtocell base station can enter active mode if required.

As regards suitable conditions for transitions between different operational states, it may be provided that transition from active operational mode to low-duty operational mode is performed if either no mobile station is associated with the mobile station, or if all associated mobile stations operate in a sleep or idle mode. In opposite direction it may be provided that a transition from low-duty operational mode or from radio interface listen mode to active operational mode is performed if a mobile station enters the coverage area of the base station, or if an associated mobile station requests to leave its sleep or idle mode. Transition from low-duty operational mode to radio interface listen mode may be performed, as the base station's autonomous decision, if no mobile station is attached to the base station nor located in its coverage area.

Figure 3:
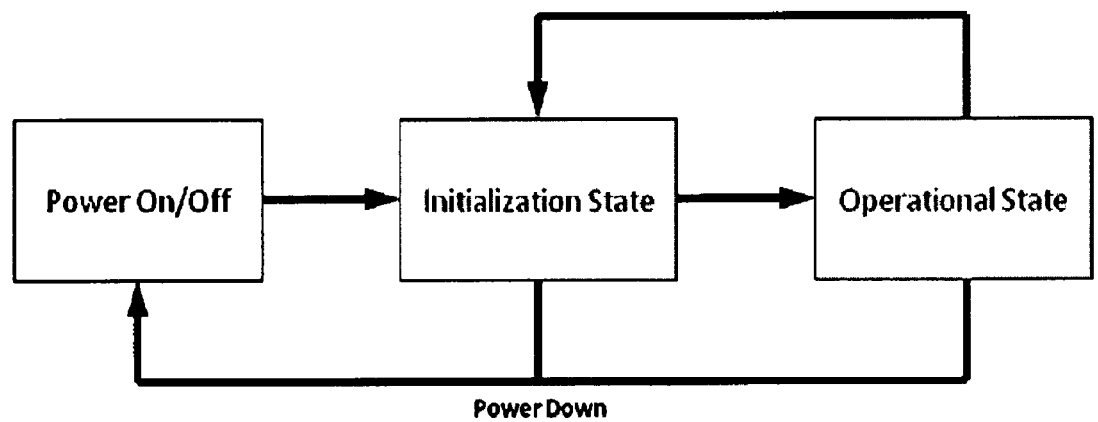
Figure 4:
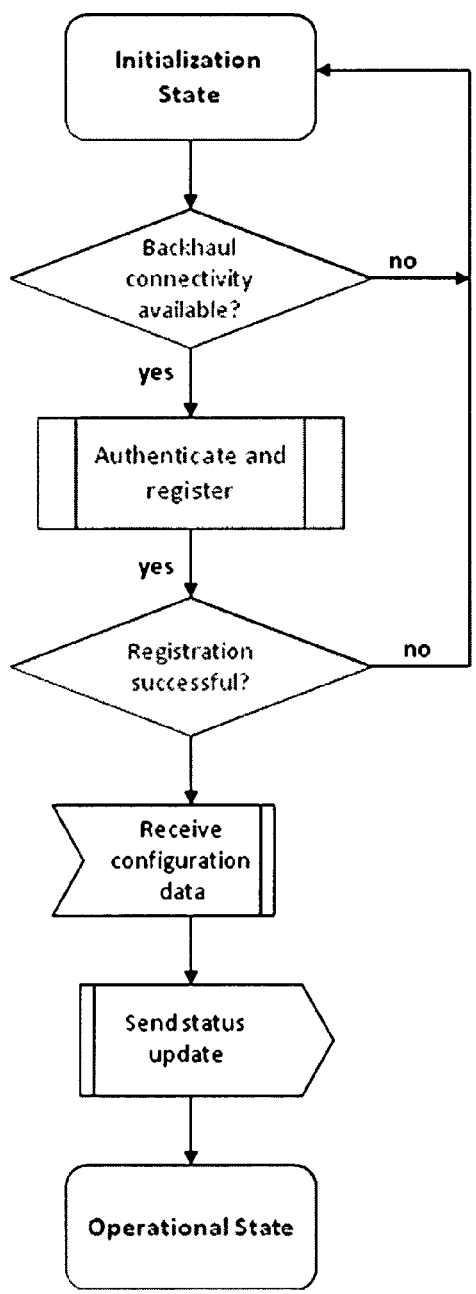
Figure 5:
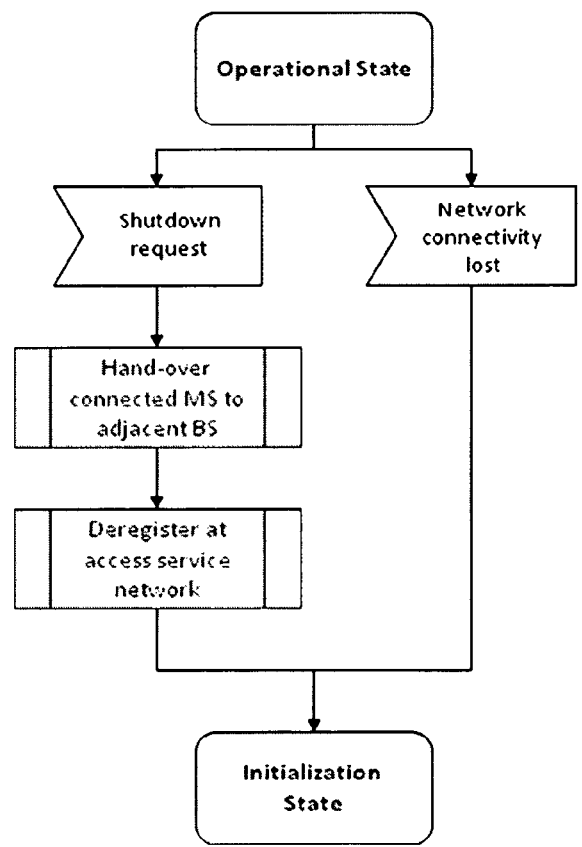
Figure 6:
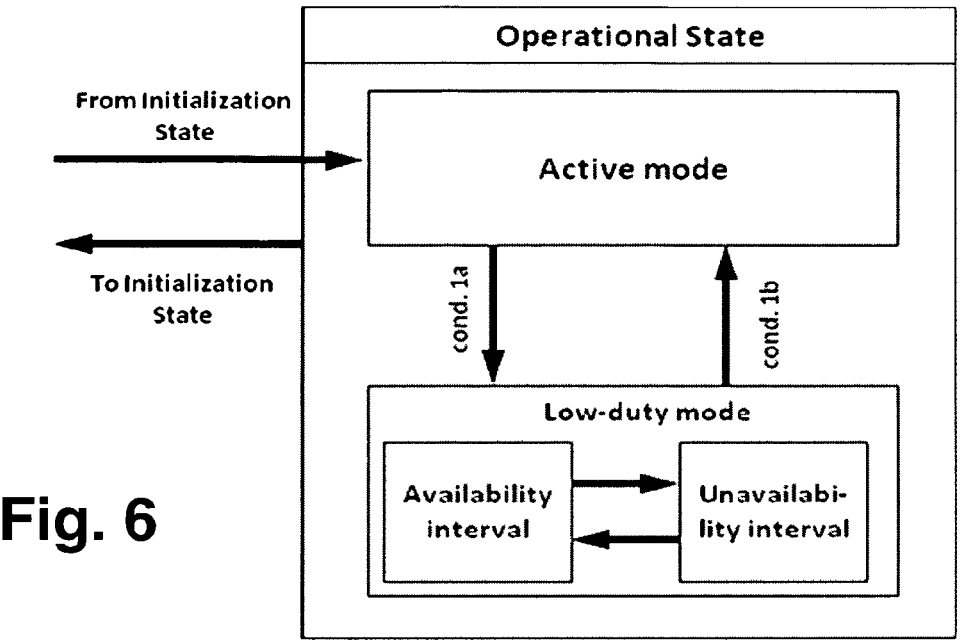
Figure 7:
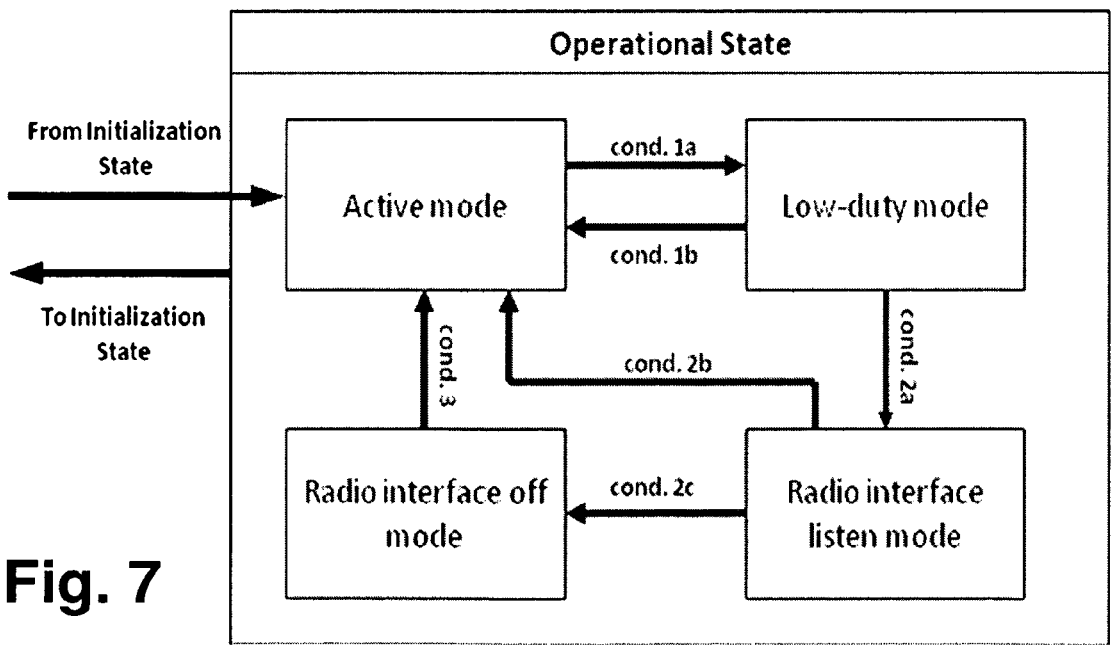
Figure 8:
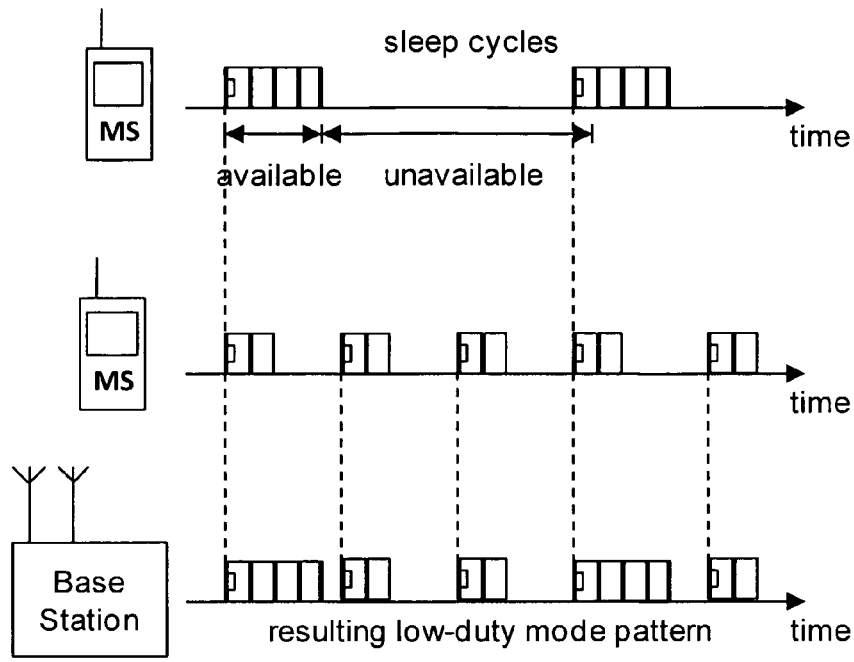
Figure 9:
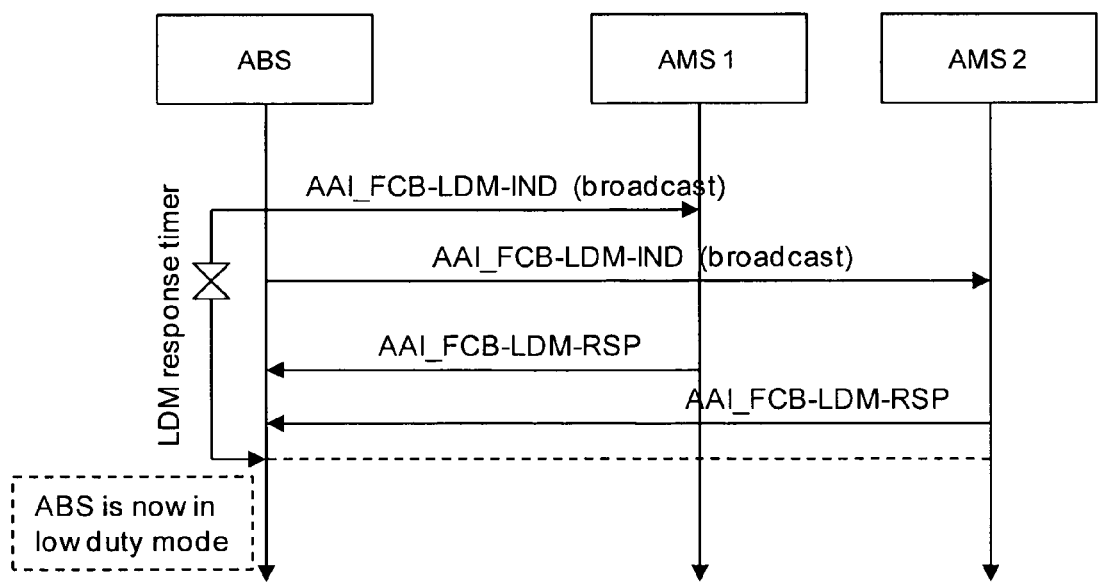
Figure 10:
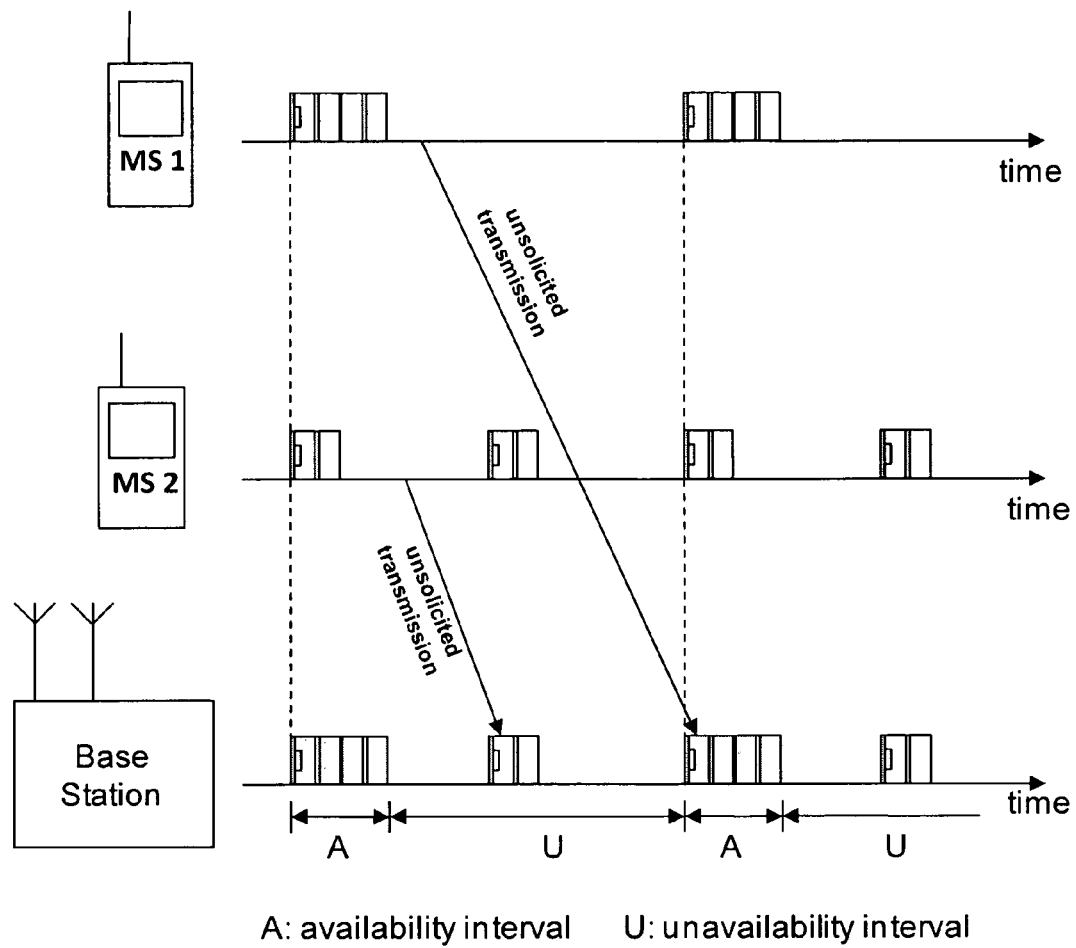
Figure 11:
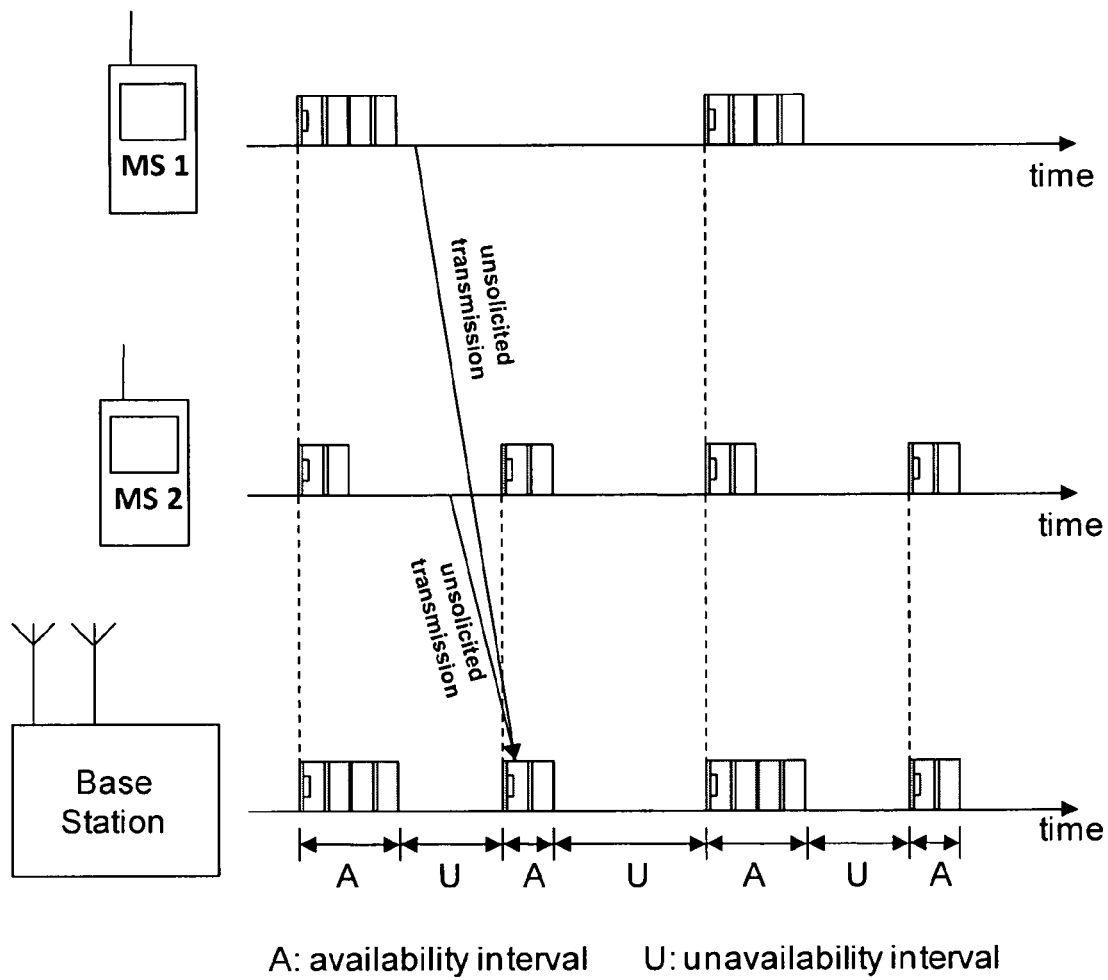

There are several ways how to design and further develop the teaching of the present invention in an advantageous way. To this end, it is to be referred to the patent claims subordinate to patent claims 1 and 17 and to the following explanation of preferred examples of embodiments of the invention, illustrated by the figures. In connection with the explanation of the preferred examples of embodiments of the invention by the aid of the figures, generally preferred embodiments and further developments of the teaching will be explained. In the drawings FIG. 1 is a schematic view of a mobile communication network with femtocell support, FIG. 2 is a schematic view of the main components of a femtocell base station, FIG. 3 is a schematic view of three basic operation states of a base station, FIG. 4 is a flow diagram illustrating a femtocell's network attachment flow, FIG. 5 is a flow diagram illustrating a femtocell's network detachment flow, FIG. 6 is a schematic view illustrating two different operational modes of a base station according to a first embodiment of the present invention, FIG. 7 is a schematic view illustrating four different operational modes of a base station according to another embodiment of the present invention, FIG. 8 is a schematic view illustrating an embodiment of the low-duty operational mode of FIGS. 6 and 7, FIG. 9 is a diagram illustrating an embodiment of a low-duty mode indication sequence, FIG. 10 is a diagram illustrating an embodiment of low-duty mode pattern signaling to mobile stations in a basic version, FIG. 11 is a diagram illustrating an embodiment of low-duty mode pattern signaling to mobile stations in an advanced version, FIG. 12 is a diagram illustrating the appliance of the basic version of low-duty mode pattern signaling of FIG. 10 with superframe-based interval lengths, and FIG. 13 is a diagram illustrating the appliance of the advanced version of low-duty mode pattern signaling of FIG. 11 with superframe-based interval lengths.

FIG. 1 illustrates schematically an exemplary mobile communication network with femtocell support, in which a method according to the present invention can be suitably applied. The considered system as shown in FIG. 1 comprises a number of femtocell base stations FCBS and a macro cell base station. Via the IP backhaul the FCBSs are in connection with an access service network controller, which is the logical entity of the ASN (access service network) and which is responsible for network management and maintenance tasks. Consequently, the FBSs are fully integrated in the radio access network of the operator by fixed network access. The femtocell BS may also have direct communication links utilizing the air interface (either one- or bi-directional) to co-located macro BSs and FCBSs. In compliance with typical architecture of wireless communication networks, the macro BS is directly connected to the access service network controller. Furthermore, FIG. 1 depicts a number of mobile stations MSs being associated either with one of the FCBSs or with the macro BS. It is assumed that the MSs are capable of power-saving techniques like sleep mode and/or idle mode operation.

Figure 2:
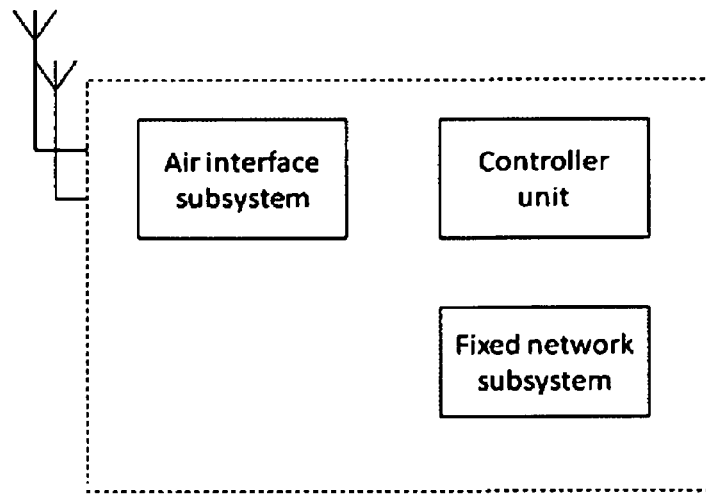

FIG. 2 illustrates schematically the basic components of a femtocell base station. Typically, a femtocell base station is equipped with a fixed network subsystem as well as with an air interface subsystem. A widely employed type of femtocells is based on the WiMAX and IEEE 802.16 standard. WiMAX is defined as World Wide Interoperability for Microwave Access based upon the standards family of IEEE 802.16. In such case the technology employed by the femtocell's air interface subsystem for data transmission is called OFDMA (Orthogonal Frequency Division Multiple Access), which is based on the usage of a large number of closely spaced orthogonal subcarriers. The OFDMA frame structure is divided by subcarriers in frequency domain, and by symbols in time domain. Users will be assigned a two dimensional (time and frequency domains) allocation, called "burst", to transmit/receive data. WiMAX is a time-synchronized communication technology in which frames have to be transmitted contemporaneously. Alternatively, the femtocell's air interface subsystem may be operated according to UMTS (Universal Mobile Telecommunications System) or 3GPP LTE (Long Term Evolution).

The fixed network subsystem is responsible for the femtocell's communication via its wired connection, which is typically a broadband internet connection. Both subsystems, i.e. the air interface subsystem and the fixed network subsystem are under the control of a controller unit.

Generally, a BS, either a FCBS or a macro BS, is managed by the radio network controller of the communication network, which is responsible for radio resource and interference management. Since different FCBSs may operate in the same frequency band, it is beneficial for system stability and performance if the radio network controller has a complete view of the network. This presumes that the FCBSs perform network entry and exit procedures such that the radio network controller can react accordingly, for example by adjusting radio resource policies for adjacent macrocell BSs and FCBSs.

FIG. 3 is a schematic overview of the basic states in which a BS, either a FCBS or a macro BS, may operate. In the following the different states are described in some more detail for the case of an FCBS. After switching the power on, the FCBS may first enter an initialization state: In this state, the FCBS is still detached from the access service network. In case of detachment only very limited functionality is supported.

In FIG. 4 the transition from the initialization state to the operational state is illustrated in some more detail. As soon as network connectivity to the access service network (backhaul connectivity) is available, the FCBS authenticates and registers itself at an access service network controller. In case of successful registration, the FOBS will receive configuration data, and in a next step it will send status updates and enter into an operational state. In this state, the FCBS is fully integrated in the network and is fully operational.

FIG. 5 is a flow diagram of an exemplary network detachment flow of an FCBS. A first reason for an FCBS to perform a transition to the initialization state may simply be the loss of network connectivity. On the other hand, it may happen that the FCBS is—actively—requested to shutdown, either by a subscriber or by the operator for maintenance reasons. In such case a network shutdown procedure as shown in FIG. 5 may be performed in order to signal to the radio network controller that the FCBS is going to detach itself from the network, thereby enabling the radio controller to take this into account for radio network and interference management, and in order to notify associated mobile stations that service will discontinue, and to perform appropriate procedures like forced handovers to adjacent femtocell BS or macro cell base stations.

Transition to the initialization state is done after the FCBS successfully notified the access network radio network controller that it will shutdown, or with a timer mechanism in case that no network connectivity is available.

FIG. 6 is a schematic view illustrating two different operational modes of a base station according to a first embodiment of the present invention. The two operational modes include the active mode, which is implemented as default operational mode being entered from an initialization state as described in connection with FIG. 4, and a low-duty operational mode. According to the invention, in this mode the BS implements a window mechanism with availability and unavailability intervals, where in the latter case no radio transmissions are allowed.

As can be obtained from FIG. 6, a transition from active operational mode to low-duty operational mode will be performed, if a certain condition—named condition 1a—is fulfilled. In the illustrated case condition 1a is assumed to be satisfied if either no mobile station is associated with the BS, or if all associated mobile stations operate in sleep or idle mode that is implemented with a window mechanism including active periods and periods of reduced activity. A transition back from low-duty operational mode to active mode is performed in case condition 1b is fulfilled. Condition 1b may be defined to be satisfied in case of the occurrence of at least one of the following events:

An MS performs a hand-over from an adjacent cell
  An MS requests to leave sleep/idle mode
  An MS enters the coverage area of the BS, and the uplink received signal power of said MS is used with a threshold-based algorithm to decide on the transition
  The radio network controller requests operation in active mode, for example for hand-over assistance.

FIG. 7 is a schematic view again illustrating different operational modes of a base station. However, in contrast to the embodiment of FIG. 6, two further operational modes are implemented—a radio interface listen mode and a radio interface off mode. It is to be understood that implementations with only the radio interface listen mode as additional operational mode are also possible.

The conditions for a transition between active operational mode and low-duty operational mode are the same as in FIG. 6. Further, when operating in low-duty operational mode the BS has the opportunity to perform a transition to radio interface listen mode in case no MSs are attached to the BS and in the coverage area of the BS. In the radio interface listen mode, the BS stops all transmissions on the radio interface, but is still listening for potential connection attempts.

In radio interface off mode, the radio interface subsystem of the BS is completely switched off. However, the connection to higher layer controllers over the fixed network interface is maintained, such that the BS can enter active mode if required. The BS may autonomously decide to perform a transition from radio interface listen mode to radio interface off mode (condition 2c) by switching off its radio interface subsystem. For example, it may be provided that the BS enters this mode after a predefined time period expired without any MS signaling. For performing a transition from radio interface listen mode to active mode the same conditions (conditions 2b) should be fulfilled as defined above for a transition from low-duty mode to active mode (condition 1b).

From radio interface off mode the BS may enter active mode on request by the radio network controller or by manual user request (condition 3).

The basic operating principle of the low-duty mode of FIGS. 6 and 7 is illustrated in some more detail in connection with FIG. 8. In a mobile wireless system with a clocked TDMA frame structure (including OFDM/OFDMA) which support sleep and/or idle modes for mobile stations, periods of activity (called listening window or availability interval) alternate with intervals of inactivity (denoted unavailability interval or sleep window). During an unavailability interval, the MS has the possibility to switch off parts of the radio interface in order to save energy. Each sleep cycle consists of an availability interval (i.e. listening interval/window) and an unavailability interval. The sleep cycles are known at the base station and also may be reconfigured at any time. This can be exploited to reduce interference and energy consumption at the base station side, by switching of parts of the radio interface or just not transmitting any downlink control signals like frame preambles or headers.

In the illustrated embodiment the base station is configured to become active whenever the superposition of all sleep cycles of mobile stations in its coverage area indicates an availability interval (i.e. listening interval/window). Minimal energy consumption can be achieved by configuring congruent sleep cycles, i.e. starting frames and interval length, for all mobile stations. However, since sleep cycles are adapted to traffic characteristics, this might not be possible in all cases, or for performance reasons non-overlapping sleep cycles are preferable.

At the base station, the superposition of sleep cycles thus creates a pattern which in the following is denoted as low-duty mode pattern (LDM pattern), as illustrated in FIG. 8. In intervals where no mobile station requires the availability of the base station, i.e. in an unavailability interval, the base station can stop transmission of downlink control. Since mobile stations are aware of their own availability intervals only, it is beneficial for them to be aware of LDM pattern at the base station such that mobile stations, which want to exit sleep or idle mode, know in which frame transmission opportunities in the uplink and downlink control information are available.

As illustrated in FIG. 9, before entering low-duty mode, a hand-shake mechanism may be established to guarantee that all connected mobile stations are informed of the LDM patterns of the BS. For instance, a broadcast message, like an AAI_FCB-LDM-IND message, with a broadcast base station ID, such as STID, may be sent to all MSs within the coverage area of the BS. Mobile stations in connected mode can then answer with a response message, like an AAI_FCB-LDM-RSP message, indicating either the acceptance of the LDM patterns, or indicating that signaling (e.g. handover, network entry, signaling from core network or macrocell BS) or pending traffic requires exiting sleep mode.

At the instance of broadcasting, a timer (denoted LDM_response_timer) is started. If the timer exceeds a predefined value (denoted LDM_response_deadline), the attempt to enter low duty mode failed and an AAI_FCB-LDM-IND message with e.g. LDM_pattern_type=0b11 (indicating the exiting of low-duty operational mode) is sent. The base station shall repeat sending this message until all mobile stations in connected mode respond with an accepting AAI_FCB-LDM-RSP message (e.g. with LDM_pattern_type=0b00).

Another option is to include LDM pattern information with the downlink broadcast control information, like the secondary superframe header (S-SFH) as specified in IEEE 802.16 WG, "Part 16: Air Interface for Fixed and Mobile Broadband Wireless Access Systems; Advanced Air Interface (working document)", June 2009. Broadcast of the LDM pattern should occur in regular, not too large intervals to ensure timely reception at mobile stations in idle mode. An S-SFH subpacket IE may be used for carrying the relevant control information as defined for the AAI_FCB-LDM-IND message. This messaging option is useful for mobile stations in idle mode which are not explicitly connected to the base station.

Moreover, before entering low duty mode, it may be provided that the base station can re-negotiate the sleep cycles of MS in connected mode for sleep cycle alignments, for example, with AAI_SLP-RSP messages. Re-negotiating has to take resource availability in the mobile station and at the base station into account, such that resource and quality of service requirements are fulfilled and the number of unavailability frames is maximized.

In the following different embodiments of LDM pattern signaling to mobile stations are described in connection with FIGS. 10 and 11. As already mentioned above LDM patterns are a series of availability and unavailability intervals as a result of sleep and idle mode cycles of connected or camping mobile stations. Depending on the number of connected mobile stations and their traffic characteristics, the complexity of the pattern can be low in case of periodic sleep cycles of equal length, or high in case of heterogeneous sleep cycle definitions. Additionally, mobile wireless systems might support implicit changes of sleep or listening windows, such as in case of IEEE 802.16e (IEEE 802.16 Rev2, January 2009). Here, sleep windows may be exponentially increased up to a preconfigured maximum length if no signaling (e.g. handover, network entry, signaling from core network or macrocell BS) or data traffic occurs during a sleep cycle. Also, exceptions of sleep intervals might occur for example if retransmissions are scheduled which cannot be postponed, like in case of N-stop-and-wait Hybrid ARQ. The base station must obey these rules if supported and provide availability intervals at the appropriate times.

However, in case that a mobile station wants to transmit in an unsolicited fashion within a sleep window, this might not be possible in case the base station is at the same time unavailable from the radio interface. With knowledge of when the base station is available, the mobile station can postpone transmission of the packet until an availability interval is reached. This requires signaling of the LDM pattern to the mobile stations, since mobile stations are only aware of their own availability intervals.

In most wireless systems, if a mobile station is in idle mode, base stations are not aware of its presence within their coverage area. Instead, the mobile stations listen and synchronize to downlink broadcast control information, often sent at regular intervals like every frame (or superframe, as in IEEE 802.16 WG, "Part 16: Air Interface for Fixed and Mobile Broadband Wireless Access Systems; Advanced Air Interface (working document)", June 2009). This means that the base station in low-duty operational mode should ensure that downlink control information is transmitted in intervals not too large, to avoid loss of synchronization and long network entry times. Transmission of LDM patterns in downlink control broadcast information provides mobile stations the exact times when to attempt a network entry, and thus increases performance.

In the following the indication of availability intervals to MSs is illustrated on the basis of an exemplary IEEE 802.16m system (as specified in IEEE 802.16 WG, "Part 16: Air Interface for Fixed and Mobile Broadband Wireless Access Systems; Advanced Air Interface (working document)", June 2009). An LDM pattern provides mobile stations information on when downlink control information is available. LDM pattern signaling is distinguished in two different modes, which are denoted basic type and advanced type. Additionally, in a transparent type, only the transition to low-duty mode is signaled to the mobile stations.

Basic LDM pattern signaling consists of LDM cycles, which contain a BS availability and BS unavailability interval. Basic LDM pattern signaling is used to indicate availability intervals which do not completely reflect the sleep cycles of all connected mobile stations. This means that from the perspective of a mobile station, the base station is available within the availability intervals at the mobile station itself, and, additionally, in the signaled availability intervals of the basic LDM pattern. However, a mobile station is not aware of the availability intervals of other mobile stations. Thus, only known availability frames can be used for unsolicited transmissions.

FIG. 10 shows an example of a basic LDM pattern signaling, indicated by grey frames. It is important to note that MS 1 is only aware of the next indicated (i.e. signaled) availability interval, although the base station becomes available more early due to the sleep cycle of MS 2. This type of signaling pattern may be useful with dynamic, implicitly adapted sleep cycles at the mobile stations, which cannot be mapped to a deterministic pattern at the base station.

In contrast to basic LDM pattern signaling as described above, advanced LDM pattern signaling is used to indicate more complex availability interval occurrences, particularly suitable for patterns resulting from superposition of static sleep cycles. Advanced LDM pattern signaling is designed to cover all availability frames and thus enable a potentially faster reaction on unsolicited transmission requests. Advanced LDM patterns may be signaled in form of a bitmap, where one bit indicates availability/unavailability of a frame starting from a frame offset. The length of the bitmap also indicates the length of the LDM pattern.

FIG. 11 shows an example for advanced LDM pattern signaling as a result of sleep cycles of mobile stations. Here, MS 1 uses the next indicated availability interval for unsolicited transmission, which concurs with the next availability interval of MS 2. Advanced LDM pattern signaling may be performed by employing an AAI_FCB-LDM-IND message with LDM_pattern_type=0b01.

FIG. 12 shows an example of basic LDM pattern signaling as described in connection with FIG. 10, where the length of intervals is measured in superframes. Downlink control information here contains superframe header, primary advanced preamble and secondary advanced preamble, as specified in IEEE 802.16 WG, "Part 16: Air Interface for Fixed and Mobile Broadband Wireless Access Systems; Advanced Air Interface (working document)", June 2009. An AAI_FCB-LDM-IND MAC management message with LDM_pattern_type=0b00 may indicate the parameters of the basic LDM pattern.

FIG. 13 shows an example of advanced LDM pattern signaling as described in connection with FIG. 11, where the length of intervals is measured in superframes. In FIG. 13, availability intervals are indicated with superframe activity bitmaps of several bits, where a "1" indicates an active frame within the superframe, and a "0" indicates an inactive frame. The example shows an illustration of an advanced LDM pattern defined by four consecutive superframe activity bitmaps.

In transparent mode mentioned above, which may be indicated by LDM_pattern_type=0b10, the base station does not provide any information about the LDM pattern to the mobile stations. So the mobile stations are not aware of the LDM pattern. However, the base station guarantees that it is available in frames indicated by the sleep cycle definition of the mobile station.

In the following possible MAC management message formats that may be used for LDM pattern signaling are summarized. Example parameters for the AAI_FCB-LDM-IND message (Femtocell Base Station Low Duty Mode Indication Message) are listed in the following table:

| Syntax | Size (bit) | Notes |
|---|---|---|
| AAI_FCB-LDM-IND_Message_Format( ){ | | |
|   Management Message Type = XX | 8 | |
|   Start_frame_number | TBD | |
|   LDM_pattern_type | 2 | |
|   If (LDM_pattern_type == 0b00){ | | |
|     Availability_interval | 8 | Length of availability interval in superframes |
|     Unavailability_interval | 8 | |
|   } elseif (LDM_pattern_type = 0b01) { | | |
|     Number_of_SF_bitmaps | 4 | Number of superframe indication bitmaps |
|     for (j = 0; j <= Number_of_SF_bitmaps; j++) | | |
|     { | | |
|       SF_activity_bitmap | 4 | |
|       Padding | | |
|     } | | |
|   } | | |
| } | | |

Parameter description:
Start_frame_number
specifies the superframe number for entering low duty mode
LDM_pattern_type
indicates the type of the LDM pattern:
LDM_pattern_type=0b00: Basic pattern indication
LDM_pattern_type=0b01: Advanced pattern indication
LDM_pattern_type=0b10: Transparent mode
LDM_pattern_type=0b11: Exit low duty mode
Availability_interval
specifies the initial duration of the availability interval in number of superframes
Number_of_SF_bitmaps
number of superframe activity indication bitmaps in this pattern definition
SF_activity_bitmap
describes which frames in a superframe are available. "1" indicates that radio is available.
Unavailability_interval
specifies the duration of the unavailability interval counted in superframes Example parameters for the AAI_FCB-LDM-RSP message (Femtocell Base Station Low Duty Mode Response Message) are listed in the following table:

| Syntax | Size (bit) | Notes |
|---|---|---|
| AAI_FCB-LDM-RSP_Message_Format( ){ | | |
|   Management Message Type = XX | 8 | |
|   response | 8 | |
| } | | |

Parameter description:
response
indicates the response of mobile stations on a AAI_FCB-LDM-IND message.
response=0: Acknowledge entering low duty mode with signaled parameters
response=0x1: Negative acknowledge
response=0x2: Negative acknowledge, pending data is going to be transmitted
response=[0x3 . . . . 0x8]: Reserved Many modifications and other embodiments of the invention set forth herein will come to mind the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method for operating a base station of a mobile wireless system of a mobile communications network, the method comprising:
operating the base station in one of different operation states, the operation states at least including an active operational mode, and a low-duty operational mode (LDM) with reduced radio transmission activity compared to the active operational mode, the low-duty operational mode including availability intervals during which radio transmissions are allowed and unavailability intervals in which no radio transmissions are allowed,
wherein the base station has a basic LDM pattern which includes a base station (BS) availability and BS unavailability interval, the BS availability and BS unavailability interval being measured in superframes.

2. The method according to claim 1, wherein the base station informs basic LDM pattern signaling to mobile stations.

3. The method according to claim 2, wherein the base station broadcasts the basic LDM pattern signaling to the mobile stations.

4. The method according to claim 2, wherein the informed basic LDM pattern signalling includes at least one of Start_frame_number which specifies a superframe number for entering LDM, Availability_interval which specifies an initial duration of the availability interval in superframes, or Unavailability_interval which specifies an initial duration of the unavailability interval in superframes.

5. The method according to claim 1, wherein the base station is a femtocell base station.

6. The method according to claim 1, wherein the base station is configured to receive information from associated mobile stations regarding an acceptance of the availability and unavailability intervals of the base station, before entering the low-duty operational mode.

7. The method according to claim 1, wherein the base station is configured to re-negotiate sleep cycles of mobile stations in a connected mode for alignment purposes.

8. The method according to claim 1, wherein the active operational mode is configured as a default operation state to be entered by the base station when performing a transition from an initialization state.

9. The method according to claim 1, wherein the operation states include an additional operational mode, the additional operational mode being a radio interface listen mode in which no radio transmission activity occurs, but the base station is listening for potential connection attempts.

10. The method according to claim 1, wherein the operation states include an additional operational mode, the additional operational mode being a radio interface off mode in which a radio interface subsystem of the base station is completely switched off.

11. The method according to claim 3, wherein the informed basic LDM pattern signalling includes at least one of Start_frame_number which specifies a superframe number for entering LDM, Availability_interval which specifies an initial duration of the availability interval in superframes, or Unavailability_interval which specifies an initial duration of the unavailability interval in superframes.

12. The method according to claim 2, wherein the base station is a femtocell base station.

13. The method according to claim 3, wherein the base station is a femtocell base station.

14. The method according to claim 4, wherein the base station is a femtocell base station.

15. A base station for deployment in a mobile wireless system, comprising:
one or more processing devices configured to perform the method according to claim 1.

16. The method for operating a mobile station of a mobile wireless system of a mobile communications network, the method comprising:
operating the mobile station in one of different operation states, the operation states at least including an active operational mode, and a low-duty operational mode (LDM) with reduced radio transmission activity compared to the active operational mode,
wherein the mobile station has availability intervals during which radio activity is allowed and unavailability intervals in which no radio activity is allowed, and
the mobile station is aware of a basic LDM pattern of a base station which includes a base station (BS) availability and BS unavailability interval, the BS availability and BS unavailability interval being measured in superframes.

17. The method according to claim 16, wherein basic LDM pattern signaling is broadcasted to mobile stations.

18. The method according to claim 16, wherein informed basic LDM pattern signalling includes Start_frame_number which specifies a superframe number for entering LDM.

19. The method according to claim 16, wherein the base station is a femtocell base station.

20. A mobile station for deployment in a mobile wireless system, the mobile station comprising:
one or more processing devices configured to perform the method according to claim 16.

* * * * *